(12) United States Patent
Iwashita et al.

(10) Patent No.: US 7,030,585 B2
(45) Date of Patent: Apr. 18, 2006

(54) CONTROLLER

(75) Inventors: Yasusuke Iwashita, Yamanashi (JP);
Hiroyuki Kawamura, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/751,914

(22) Filed: Jan. 7, 2004

(65) Prior Publication Data

US 2004/0135536 A1 Jul. 15, 2004

(30) Foreign Application Priority Data

Jan. 7, 2003 (JP) ............................. 2003-001368

(51) Int. Cl.
*G05B 19/18* (2006.01)
*G05B 19/19* (2006.01)
(52) U.S. Cl. ...................... 318/567; 318/569; 318/600; 318/560; 318/73
(58) Field of Classification Search ................ 318/569, 318/567, 560, 600, 610, 609, 572, 590, 594, 318/568.17, 73
See application file for complete search history.

(56) References Cited

U.S. PATENT DOCUMENTS

| 4,611,159 A | * | 9/1986 | Kurakake et al. | ........... 318/803 |
| 5,107,193 A | * | 4/1992 | Iwashita | ...................... 318/560 |
| 5,223,778 A | * | 6/1993 | Svarovsky et al. | ......... 318/610 |
| 5,418,440 A | * | 5/1995 | Sakaguchi et al. | ......... 318/560 |
| 5,442,270 A | * | 8/1995 | Tetsuaki | ................ 318/568.22 |
| 5,448,145 A | * | 9/1995 | Iwashita | ................ 318/568.15 |
| 5,508,596 A | * | 4/1996 | Olsen | .......................... 318/569 |
| 5,691,616 A | * | 11/1997 | Iwashita | ...................... 318/615 |
| 5,736,822 A | * | 4/1998 | Mitarai et al. | ............... 318/116 |
| 5,952,804 A | * | 9/1999 | Hamamura et al. | ......... 318/560 |
| 6,020,706 A | * | 2/2000 | Iwashita et al. | ............ 318/561 |

(Continued)

FOREIGN PATENT DOCUMENTS

JP 1-319809 12/1989

(Continued)

OTHER PUBLICATIONS

Notice of Grounds for Rejection (Office Action) dated May 26, 2005 with an English translation.

*Primary Examiner*—David Martin
*Assistant Examiner*—Elias Hiruy
(74) *Attorney, Agent, or Firm*—Staas & Halsey LLP

(57) ABSTRACT

A controller capable of preventing response delay and generation of vibrations attributable thereto during position control of a movable part of a machine having low rigidity. A motor for driving a machine having low rigidity is subjected to position and velocity loop control. Compensation amount $Q_1$ proportional to command velocity obtained by differentiating a position command and compensation amount $Q_2$ proportional to second-order differentiated command acceleration are obtained. Compensation amounts $Q_1$ and $Q_2$ are added together, thus obtaining a velocity offset amount Vof corresponding to a estimated torsion amount. A differentiated value of the velocity offset amount is multiplied by coefficient $\beta$ to obtain a torque offset amount Tof. The velocity offset amount Vof is added to a velocity command Vcs obtained by position loop control 1. The torque offset amount Tof is added to a torque command Tc outputted in velocity loop control 2, and the result is used as a drive command to the motor. Based on the velocity and the torque offset amount Vof and Tof, a torsion amount between motor 3 and the machine is controlled. The machine position and velocity are controlled with accuracy by regular position and velocity loop control.

20 Claims, 9 Drawing Sheets

U.S. PATENT DOCUMENTS

| | | | |
|---|---|---|---|
| 6,046,566 A * | 4/2000 | Sonoda et al. | 318/625 |
| 6,204,622 B1 * | 3/2001 | Tsuruta | 318/609 |
| 6,274,994 B1 * | 8/2001 | Tsutsui | 318/560 |
| 6,470,225 B1 * | 10/2002 | Yutkowitz | 700/44 |
| 6,472,842 B1 * | 10/2002 | Ehsani | 318/701 |
| 6,590,358 B1 * | 7/2003 | Tsutsui | 318/560 |
| 6,738,218 B1 * | 5/2004 | Hamada et al. | 360/77.02 |
| 2004/0183495 A1 * | 9/2004 | Iwashita et al. | 318/638 |

FOREIGN PATENT DOCUMENTS

| | | |
|---|---|---|
| JP | 3-15911 | 2/1991 |
| JP | 4-271290 | 9/1992 |
| JP | 07-078031 | 3/1995 |
| JP | 7-271446 | 10/1995 |
| JP | 10-326114 | 12/1998 |
| JP | 11-309646 | 11/1999 |

* cited by examiner

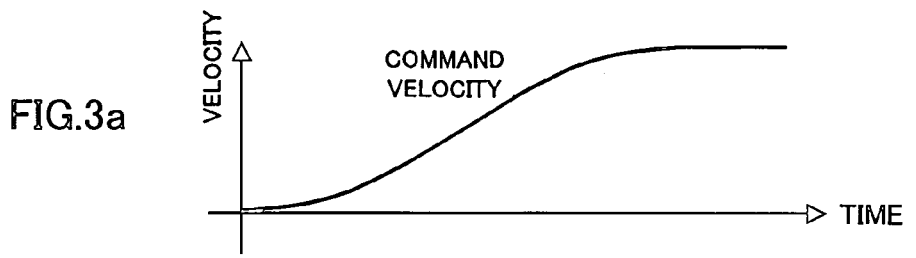
FIG.3a
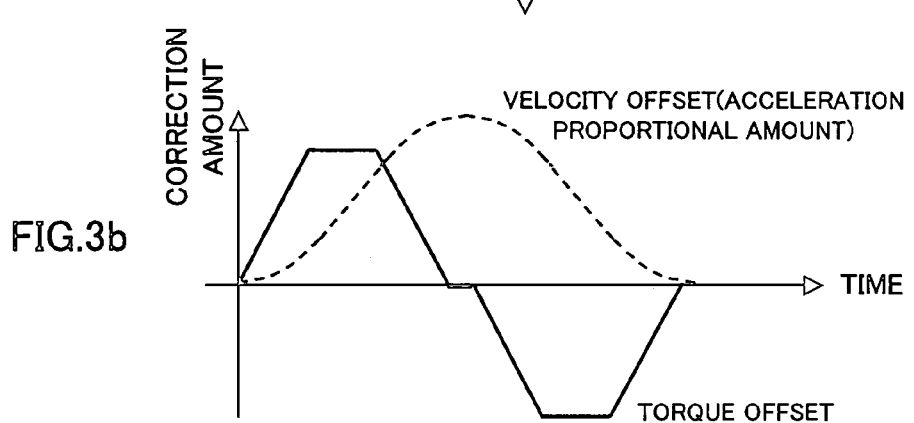
FIG.3b
FIG. 4
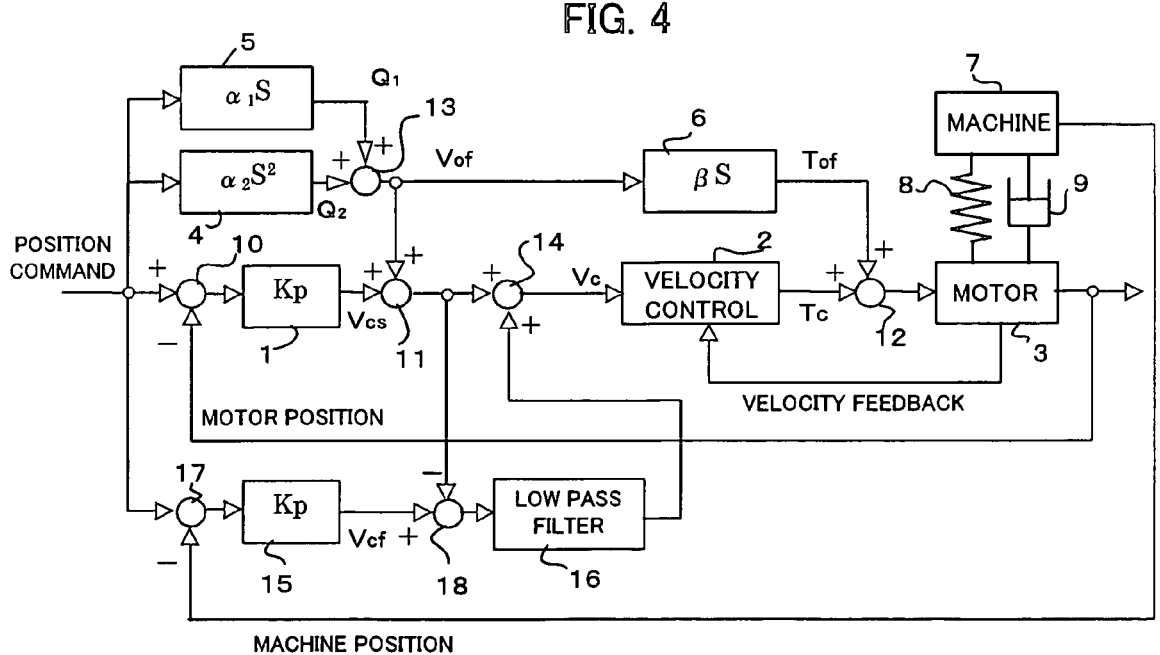

FIG.10a
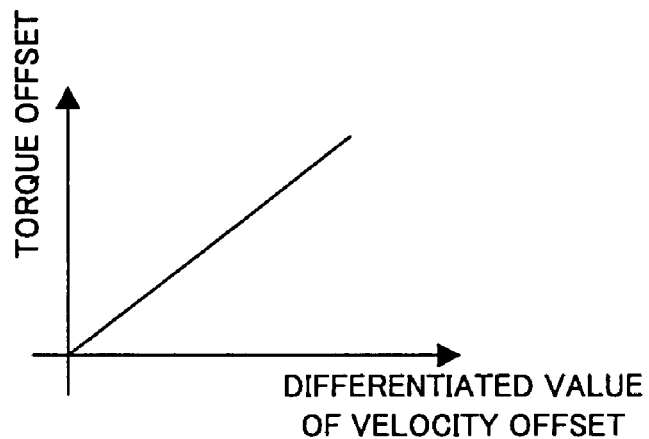
FIG.10b
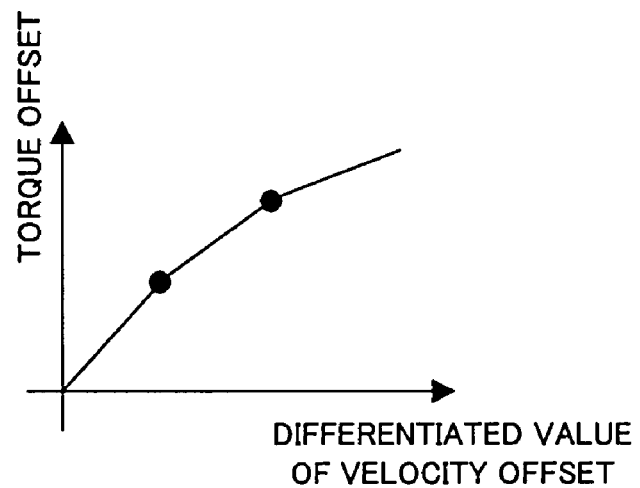
FIG.10c
| DIFFERENTIATED VALUE OF VELOCITY OFFSET | 0 | 1 | 2 | 3 | 4 | 5 | 6 | ... |
|---|---|---|---|---|---|---|---|---|
| TORQUE OFFSET | 0 | 10 | 18 | 25 | 33 | 40 | 49 | |

POSITION DEVIATION AMOUNT IN
ACCELERATION/DECELERATION IS REDUCED

CONTROLLER

BACKGROUND OF THE INVENTION

1. Field of the Invention

The present invention relates to a controller for controlling a position of a movable part of a machine by a servomotor.

2. Description of Related Art

Machines of a large size are generally subject to torsion, or a similar force, in a machine element located in between a motor for driving a machine's movable part and the machine's movable part, thereby causing the machine to have low rigidity. When the machine has low rigidity, the torsion element, or the similar force, has characteristics similar to a spring in which a torsion amount becomes larger in proportion to acceleration within a certain range. In some cases, the motor and the machine are connected to each other by spring engagement, or other possible similar connections. In this case, motion of the machine is delayed at the start of the machine motion, and the delay generates vibrations of the machine's movable part.

In such a large-scaled machine, a large position gain of a position loop can not be adopted in view of suppressing the vibrations of the machine's movable part, resulting in the delay in motion of the machine's movable part. For example, a machine tool of large size has a problem that the delay lowers its machining accuracy.

As a method for compensating the delay attributable to the low rigidity of the machine, there is a well-known method including the steps of adding the result obtained by multiplying an acceleration command value by the reciprocal number of collective longitudinal rigidity of a ballscrew driving system to the result obtained by multiplying the acceleration command value by the reciprocal number of collective torsion rigidity of the ballscrew driving system, multiplying this additional value by load moment of inertia to obtain a flexure compensation value, differentiating the flexure compensation value to obtain a flexure velocity compensation value, further differentiating the flexure velocity compensation value to obtain a torque compensation value, and adding the flexure compensation value, the flexure velocity compensation value and the torque compensation value to a position command value, a velocity command value and a torque command value, respectively, thus carrying out the flexure compensation of the ballscrew driving system (see JP 10-326114A for example).

In addition, there is another well-known method in which an offset amount proportional to the acceleration of a motion command is added to a velocity command obtained by position loop control to use the result as a velocity command to a velocity loop, thus compensating the delay corresponding to torsion that is attributable to the low rigidity (JP 3308656B, for example).

SUMMARY OF THE INVENTION

When a machine element having low rigidity is situated in between a movable part of a machine and a motor for driving the movable part and a command is given to the machine to move the movable part, the present invention suppresses a delay of motion of a machine's movable part which is caused by torsion, or the like, of the machine element between the movable part of the machine and a motor for driving the movable part. By suppressing a delay of motion of a machine part, vibrations caused by the delay are reduced.

A controller of the present invention controls a servomotor for driving a movable part of a machine such that a position of the movable part is controlled by performing a position loop control based on a position command and a detected motor position to obtain a velocity command and by performing a velocity loop control based on the velocity command and a detected motor velocity to obtain a torque command for the servomotor.

According to one aspect of the present invention, the controller comprises: velocity command determining means for obtaining a compensated velocity command for the velocity loop control by adding a velocity offset amount proportional to a command acceleration to the velocity command outputted by the position loop control; torque offset calculation means for calculating a torque offset amount based on a differentiated value of the velocity offset amount; and torque command determining means for obtaining a compensated torque command for the servomotor by adding the torque offset amount to a torque command outputted by the velocity loop control performed based on the compensated velocity command. With the above arrangement, the torsion of the machine is compensated to reduce a response delay and also suppress the vibrations. Additionally, the velocity offset amount may be a sum of an offset amount proportional to a command velocity and an offset amount proportional to the command acceleration.

The controller may further comprise first additional means for obtaining an additional velocity command for a position full-closed loop control based on the command position and a detected position of the movable part of the machine; and second additional means for adding a high frequency component of the compensated velocity command and a low frequency component of the additional velocity command, and outputting an obtained sum to the velocity loop control. In this case, the second additional means may output a sum of: a low frequency component subjected to low-pass filter processing of an amount obtained by subtracting the compensated velocity command from the additional velocity command; the velocity command outputted by the position loop control; and the velocity offset amount.

According to another aspect of the present invention, the controller comprises: first position control means for obtaining a first velocity command based on a position deviation between a command position and a detected rotational position of the servomotor; second position control means for obtaining a second velocity command based on a position deviation between the command position and a detected position of the movable part of the machine; calculation means for calculating a velocity command difference obtained by subtracting the first velocity command from the second velocity command; velocity control means for performing a velocity loop control based on a velocity command and a detected rotational velocity of the servomotor to obtain a torque command for the servomotor; velocity offset calculation means for obtaining a velocity offset amount as a high frequency component of a difference obtained by subtracting the velocity command difference from an offset amount proportional to a command acceleration; torque offset calculation means for calculating a torque offset amount based on a differentiated value of the velocity offset amount; velocity command determining means for obtaining the velocity command to the velocity control means by summing a low frequency component of the velocity command difference, the first velocity command and the velocity offset amount; and torque command determining means for to obtaining a compensated torque command for the servomotor by adding the torque offset amount to a torque command outputted from the velocity control means, thereby using feedback to control the torsion.

The velocity offset calculation means may obtain the velocity offset amount as a high frequency component of a difference obtained by subtracting the velocity command difference from a sum of the offset amount proportional to the command acceleration and an offset amount proportional to a command velocity.

The offset amount proportional to the command acceleration may be obtained by second-order differentiation of the position command.

The torque offset calculation means may obtain the torque offset amount by multiplying the differentiated value of the velocity offset amount by a predetermined proportional coefficient. Alternatively, the torque offset calculation means may obtain the torque offset amount according to linear expressions expressing the torque offset amount for divided ranges of the differentiated value of the velocity offset amount. Further, the torque offset calculation means may obtain the torque offset amount according a table storing relation between the differentiated value of the velocity offset amount and the torque offset amount.

According to a still another aspect of the present invention, the controller may simply include torque command determining means for obtaining a compensated torque command for the servomotor by adding a torque offset amount proportional to a command jerk to a torque command outputted by the velocity loop control.

BRIEF DESCRIPTION OF THE DRAWINGS

FIGS. 3a and 3b are explanatory graphs showing a velocity offset amount and a torque offset amount in the same embodiment;

FIG. 4 is a block diagram showing a motor control system according to a second embodiment of the present invention;

FIGS. 10a, 10b and 10c are explanatory diagrams showing examples that define relation between a differentiated value of a velocity offset amount and a torque offset amount in respective embodiments;

DETAILED DESCRIPTION

Figure 1:
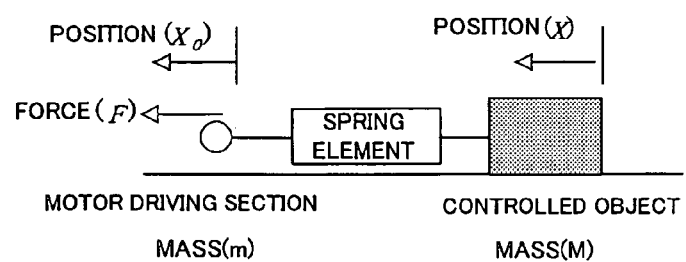
FIG. 1 is an explanatory diagram showing a model in which a machine having low rigidity is connected by spring engagement.

A model in which a machine having low rigidity is connected by spring engagement is illustrated in FIG. 1. Dynamic equations of a spring system are expressed as the following equations (1) and (2):

$$Ma = k(X_0 - X) \quad (1)$$

$$ma_0 = F - k(X_0 - X) \quad (2)$$

where F is an output of a motor that is an input to the spring system, k is a spring constant, X is a motion amount from a standstill position of the machine, $X_O$ is a motion amount from a standstill position of the motor (a unit thereof is identical to that of the motion amount of the machine), a is acceleration of the machine, $a_0$ is acceleration of the motor, M is mass of the machine, and m is mass of a motor driving section.

In other words, force transmitted from the motor becomes acceleration of the motor and expansion and contraction of the spring, and the expansion and contraction of the spring activates the machine as a controlled object.

In cases where the force F increases with a time constant that is sufficiently long, acceleration in a very short time can be considered to be 0. In this case, according to the above equation (2), an amount of expansion and contraction of the spring $(X_0-X)$ is F/k. If the amount of expansion and contraction F/k is desirably generated in cases where the force F is given, the spring system shows the same movement as a rigid body when the force F is given so as to coincide with the amount of expansion and contraction F/k.

In relation to a motion command given to the machine, the motion of the motor driving section is performed in a motion amount including the amount of expansion and contraction of the spring. In regular position loop control, however, a velocity command to the motor driving section is generated on the basis of a position deviation between a position of the machine as a controlled object (in the case of a full-closed loop) or a position of the motor driving section for driving the machine (in the case of a semi-closed loop) and the motion command. Therefore, the amount of expansion and contraction of the spring depends on response of the position loop. In the case of the full-closed loop, when the position gain is small, the motor driving section operates sluggishly, thereby decreasing the accuracy although stabilizing the spring system at the same time. On the contrary, when the position gain is large, the operation of the motor driving section becomes brisk, which expands the spring more than necessary and causes vibrations.

Likewise, in the case of the semi-closed loop, when the position gain is small, the machine follows in retard, so that the deviance of the machine position with respect to the command position becomes large, thus lowering the accuracy. On the other hand, a large position gain accounts for vibrations as mentioned above.

According to the present invention, in a machine with low rigidity, for example a spring or any other machine element subject to torsion, and taking into account the amount of expansion and contraction of an element is proportional to the acceleration $a_0$ of the motor, a torsion amount (amount of expansion and contraction of the spring) is estimated from a second-order differentiated value of the motion command (command acceleration), that is substantially the same value as the acceleration $a_0$. The velocity command is then compensated in a feedforward-like manner with respect to the motor so as to generate the necessary torsion amount, thus stably creating torsion and also stabilizing the position loop.

In case that friction f exists in the machine, a dynamic equation of the machine is as follows:

$$Ma=k(X_0-X)-f$$

When the velocity is constant, there generates a position deviation corresponding to (f/k). In the case of the full-closed loop, control is performed so that the machine position X agrees with the command position. In the case of the semi-closed loop, however, the position deviation generates in the machine position X since the motor position $X_0$ agrees with the command position. This can be solved by adding the velocity offset proportional to (f/k) and the velocity command to carry out compensation so that the machine position X agrees with the command position.

Furthermore, when a machine has low rigidity, a gain in the velocity loop cannot also be increased. Therefore, even if the velocity command is compensated in the feedforward-like manner, the rotation of the motor is delayed, thus causing time delay in creating the necessary torsion amount. According to the present invention, the delay is compensated into the torque command to improve the response of the motor, thus creating the necessary torsion amount with good response.

Figure 2:
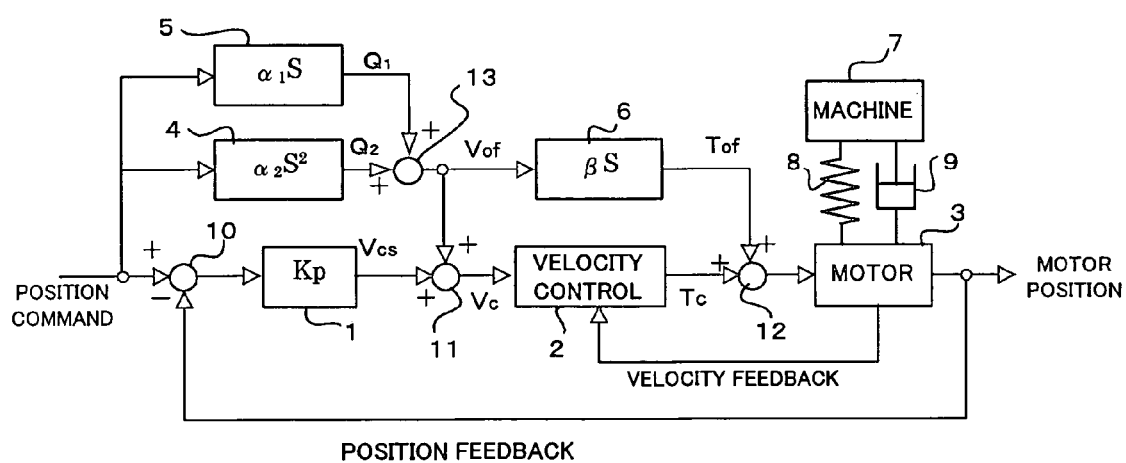
FIG. 2 is a block diagram showing a motor control system according to a first embodiment of the present invention.

FIG. 2 is a block diagram showing a motor control system of a controller for controlling a position of a machine's movable part according to a first embodiment of the present invention.

In FIG. 2, reference numeral 1 represents a term indicating a transfer function of a position gain Kp in the position loop, reference numeral 2 represents a term of a velocity control section, and reference numeral 3 represents a servomotor. Connected to the servomotor 3 is a movable part of a machine 7, such as a machine tool and the like. On condition that the servomotor 3 and the machine are connected to each other using an element having low rigidity, the drawing illustrates the connection utilizing a spring 8 in the form of a diagram. Additionally, reference numeral 9 denotes a term of friction.

In this embodiment, a term 4 is provided for predicting the torsion of the machine element having low rigidity, (the machine element being located in between the machine and the servomotor and shown, for example, as the spring 8), where term 4 outputs an amount proportional to the acceleration obtained by multiplying the acceleration of the position command for compensating the torsion amount by a compensation coefficient $\alpha_2$. In this embodiment, a term 5 is provided for outputting an amount proportional to the command velocity corresponding to the friction 9 of the machine, which is obtained by multiplying the command velocity by a compensation coefficient $\alpha_1$. The output of the terms 4 and 5 are added together using an adder 13 to obtain a velocity offset amount Vof corresponding to the estimated torsion amount. The velocity offset amount is then added to a velocity command Vcs, obtained by the position loop control 1 by means of an adder 11, thereby using the result as a velocity command Vc to the velocity control section 2.

Subsequently, in a term 6, to compensate the delay of the velocity control section 2, a differentiated value of the velocity offset amount Vof is multiplied by a compensation coefficient β to obtain a torque offset amount Tof, and the torque offset amount Tof is added to a torque command Tc by an adder 12 to use the result as a torque command (electric current command) to the motor 3.

A motor position that is feedbacked from a position detector mounted on the servomotor 3 is subtracted from the position command using a subtracter 10 to obtain a position deviation, and the position deviation is multiplied by the position gain Kp of the term 1 to obtain the velocity command Vcs (position loop control). Furthermore, the command velocity obtained by differentiating the position command in the term 5 is multiplied by the compensation coefficient $\alpha_1$ to obtain an offset value corresponding to friction. Moreover, the command acceleration obtained by second-order differentiating the position command in the term 4 is multiplied by the compensation coefficient $\alpha_2$ to obtain an offset value corresponding to the acceleration of the torsion amount. These two offset values obtained by the terms 4 and 5 are added together by the adder 13 to use the result as a velocity offset amount Vof. The velocity offset amount Vof is added to the velocity command Vcs obtained by the position loop control using the adder 11, thus correcting the velocity command Vcs. The compensated velocity command Vc serves as a command to the velocity control section 2.

In the velocity control section 2, on the basis of the compensated velocity command Vc and the actual velocity that is feedbacked from the velocity detector mounted on the servomotor 3, the velocity loop control of proportion, integral control, and the like, are performed, thus outputting the torque command Tc. On the other hand, in the term 6, the velocity offset amount Vof is differentiated, and the differentiated value is multiplied by the compensation coefficient β to obtain the torque offset amount Tof. The torque offset amount Tof is added by the adder 12 to the torque command Tc outputted from the velocity control section 2, and the result is output to the servomotor 3 to drive the same.

If the velocity control section 2 is not delayed, the spring 8 expands and contracts according to the velocity offset amount Vof proportional to friction and acceleration, so that the velocity command Vcs, that is generated by the position loop control and obtained by multiplying the position deviation between the position command and the feedbacked motor position by the position gain Kp, serves as a velocity command for displacing the machine without consideration of the spring.

However, since the machine to be controlled has low rigidity also in the velocity control section 2, it is impossible to take a large gain, which delays the operation of the motor and that of the machine's movable part with respect to the command in the velocity control section 2 as well. In the present embodiment, the delay of the velocity control section 2 is compensated by adding the torque offset amount Tof proportional to the differentiated value of the velocity offset amount Vof to the torque command Tc outputted from the velocity control section 2, thus making the machine 7 follow the position command with good response.

FIGS. 3a and 3b are explanatory graphs showing the velocity offset amount Vof and the torque offset amount Tof.

If the differentiated value of the position command, namely the command velocity, is as shown in FIG. 3a, an acceleration proportional component in the velocity offset amount Vof is as shown by a dashed line in FIG. 3b, that is proportional to the value obtained by differentiating the command velocity. The velocity offset amount Vof is obtained by adding the component proportional to the velocity of FIG. 2 and the acceleration proportional component shown by the dashed line in FIG. 3b.

Being proportional to the differentiation of the velocity offset amount Vof, the torque offset amount Tof is as shown by a solid line in FIG. 3b.

FIG. 4 is a block diagram showing a motor control system according to a second embodiment of the present invention.

The second embodiment is different from the first embodiment in that the full-closed loop control of the position is added.

In the second embodiment, a position deviation between the position command and the machine position that is feedbacked from the position detector for detecting the position of the machine's movable part is obtained by using a subtracter 17. The position deviation is multiplied by the position gain Kp (having the same value as the position gain in the term 1) in a term 15 to obtain the velocity command Vcf. The velocity command, that is compensated by adding the velocity offset amount Vof to the velocity command Vcs obtained in the semi-closed loop control, is subtracted from the velocity command generated by the full-closed loop control utilizing a subtracter 18, thereby passing the result through a lowpass filter 16. The output of a low frequency component of the lowpass filter 16 is added to the velocity command Vcs compensated by the velocity offset amount Vof using the adder 11, and the result is used as a command Vc to the velocity control section 2. The control carried out later than the velocity control section 2 is the same as that of the first embodiment.

In the second embodiment, the velocity command Vcs of the semi-closed loop, that is compensated by the velocity offset amount Vof, passes the subtracter 18 and the lowpass filter 16, and is then added to the velocity command Vcs of the semi-closed loop, that is compensated by the velocity offset amount Vof again. Consequently, the velocity command Vc inputted into the velocity control section 2 is generated by combining the low frequency component of the velocity command Vcf of the full-closed loop control with a high frequency component obtained by removing a low frequency component from the velocity command Vcs of the semi-closed loop, that is compensated by the velocity offset amount Vof. In a state of transition where the motor is accelerated or decelerated (state where the high frequency component is included), the velocity command Vcs of the semi-closed loop, that is compensated by the velocity offset amount Vof, operates effectively, thus controlling the motor. On the other hand, in a stationary state where the velocity is constant after it reaches the command velocity (state where no high frequency component, but only low frequency component, is included), the velocity command Vcs of the semi-closed loop, that is compensated by the velocity offset amount Vof, is cut, and only the velocity command Vcf by the full-closed loop control operates effectively. As a consequence, the full-closed loop control of the position is performed in the stationary state.

The velocity command Vc inputted into the velocity control section is expressed as follows:

$$Vc = Vcs + Vof + (VcfL - (VcsL + VofL))$$
$$= Vcs - VcsL + Vof - VofL + VcfL)$$

where VcfL−(VcsL+VofL) denotes the output of the lowpass filter 16.

Here, VcsL is a low frequency component of Vcs, so that (Vcs−VcsL) is representative of a high frequency component VcsH of the velocity command by the semi-closed loop control. Likewise, (Vof−VofL) denotes a high frequency component VofH of the velocity offset amount Vof. In other words, the velocity command Vc inputted into the velocity control section comprises the high frequency component VcsH of the velocity command Vcs of the semi-closed loop, the high frequency component VofH of the velocity offset amount Vof, and the low frequency component VcfL of the velocity command Vcf by the full-closed loop control of the position.

As a consequence, the high frequency components are present at the time of acceleration/deceleration, so that the velocity command by the semi-closed loop control operates effectively. In the stationary state where the velocity is constant, however, there is no high frequency component, resulting in Vcs=VcsL, Vof=VofL, and also resulting in the velocity command Vc=VcfL=Vcf, that is inputted into the velocity control section 2. Thus, as to the control of the position, only the full-closed loop control is effectively performed. Equal effects can be achieved by adding a high frequency component, that is obtained by adding the velocity command Vcs of the semi-closed loop to the velocity offset amount Vof and then filtering the result through a highpass filter, to a low frequency component obtained by passing the velocity command Vcf, that is generated by the full-closed loop control, through the lowpass filter, and using the result as the velocity command to be inputted into the velocity control section 2.

Figure 5:
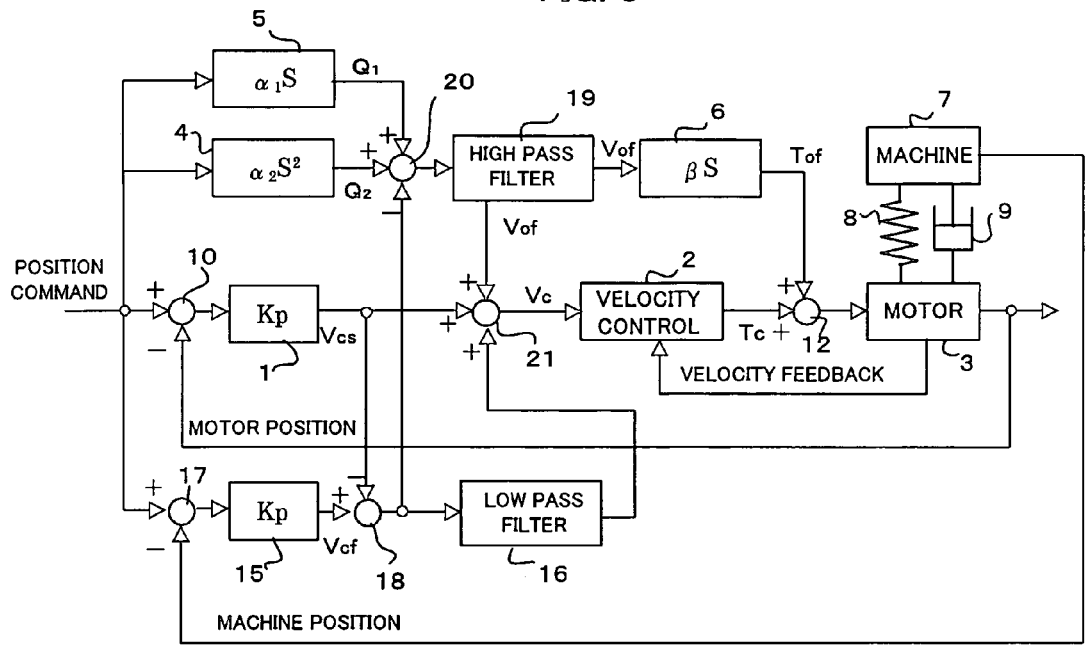
FIG. 5 is a block diagram showing a motor control system according to a third embodiment of the present invention.

FIG. 5 is a block diagram showing a motor control system according to a third embodiment of the present invention.

In the third embodiment, similarly to the second embodiment, the semi-closed and the full-closed loop control of the position are performed.

The velocity command Vcs outputted from the term 1 by the semi-closed loop control of the position is subtracted from the velocity command Vcf outputted from the term 15 by the full-closed loop control of the position using the subtracter 18 to obtain an amount corresponding to an actual torsion amount.

An adder/subtracter 20 performs a calculation of subtracting the amount corresponding to the actual torsion amount from the amount corresponding to the estimated torsion amount obtained by adding an amount $Q_2$ proportional to acceleration of the position command, that is the output of the term 4, and an amount $Q_1$ corresponding to the friction 9 of the machine, that is the output of the term 5. The result of the calculation is passed through the highpass filter 19 to obtain the velocity offset amount Vof.

In an adder 21, the obtained velocity offset amount Vof is added to the velocity command Vcs by the semi-closed loop control of the position, that is outputted from the term 1, and the result is added to difference between the velocity command Vcf by the full-closed loop control and the velocity command Vcs by the semi-closed loop control, after the difference is passed through the lowpass filter 16. The result serves as a velocity command Vc to the velocity control section 2. Furthermore, the torque offset amount Tof, that is obtained by differentiating the velocity offset amount Vof and multiplying the result by the compensation coefficient β in the term 6, is added to the torque command Tc that is the output of the velocity control section 2 and then compensated, thereby serving as a command to the servomotor 3.

In the third embodiment, the value obtained by the subtracter 18 is:

$$Kp \times (\epsilon f - \epsilon s)$$

where ϵf represents a deviation of the machine position with respect to the position command, and ϵs denotes a deviation of the motor position. (ϵf−ϵs) is representative of difference between the machine position and the motor position, thereby indicating the torsion amount that is actually generated. This means that the subtracter 18 outputs the value corresponding to the actual torsion amount. A value, that is obtained by subtracting the value corresponding to the actual torsion amount from the value corresponding to the estimated torsion amount obtained by adding the value $Q_1$ found by multiplying the command velocity by the compensation coefficient $\alpha_1$ and the value $Q_2$ found by multiplying the command acceleration by the compensation coefficient $\alpha_2$, is a deviation of the torsion amount. Since the value corresponding to the estimated torsion amount is used for issuing a command, and the value corresponding to the actual torsion amount is the value obtained by feedback, the torsion amount deviation is subjected to feedback control so as to be "0" by using the velocity offset amount Vof outputted after the process of the highpass filter. That is, in the third embodiment, the unique feedback control is carried out over the torsion amount.

Since the actual torsion amount is controlled by the command of the estimated torsion amount, the machine position is controlled by the velocity command Vcs generated by the semi-closed loop control (term 1) or the velocity command Vcf by the full-closed loop control (term 15). Furthermore, in the state of transition at the time of acceleration/deceleration, the high frequency component is removed by the lowpass filter 16, so that acceleration/deceleration is finished in spite of the operation of the velocity command Vcs of the semi-closed loop control. In the stationary state, since there is no high frequency component, and there exists the low frequency component, the velocity command Vcf by the full-closed loop control (term 15) operates effectively. That is, the output of the lowpass filter 16 is determined to be (VcfL−VcsL), and in the stationary state, there is no high frequency component as mentioned above, and the velocity offset amount Vof is "0", Vcs=VcsL. Accordingly, the velocity command Vc outputted from the adder 21 is expressed as follows:

$$Vc = Vcs + (VcfL - VcsL) + Vof$$
$$= Vcs - VcsL + VcfL$$
$$= VcfL = Vcf$$

As described above, in the stationary state other than an interval of acceleration/deceleration, the control of the position is performed through the full-closed loop control.

Figure 6:
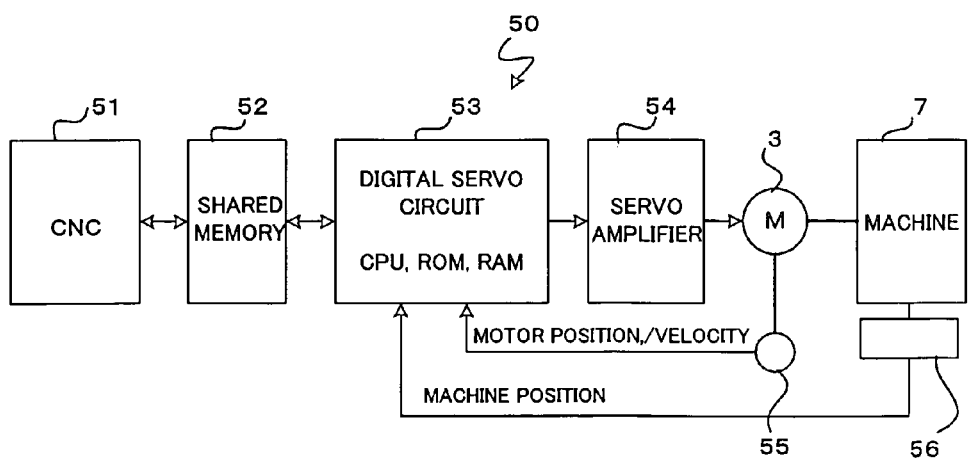
FIG. 6 is a block diagram showing couplement of a main part of a controller that carries out each embodiment of the present invention to a motor and to a machine.

FIG. 6 is a block diagram showing a main part of a controller 50 that carries out each of the above-described embodiments. The embodiment shown in FIG. 1, however, does not include a position detector 56 for detecting the position of the machine's movable part, and there is even no feedback of the position of the machine's movable part.

A numerical controller 51 outputs various commands, such as a motion command and the like, via a shared memory 52 to a digital servo circuit 53. The digital servo circuit 53 comprises a processor, memories, such as a ROM, RAM, etc., and others. Based on an issued motion command, a motor position and velocity feedbacked from a position/velocity detector 55 for detecting a rotational position and velocity of the servomotor 3, and moreover based on a machine position feedbacked from the position detector 56 for detecting the position of the movable part of the machine 7, the digital servo circuit 53 performs a control process, such as the feedback of the position and velocity, thereby carrying out the process shown in FIG. 1, 4 or 5 to obtain a torque command, driving the servomotor 3 through a servo amplifier 54, and displacing the movable part of the machine 7. Since the construction illustrated in FIG. 6 is known in the prior art, detailed descriptions of the construction will be omitted.

Figure 7:
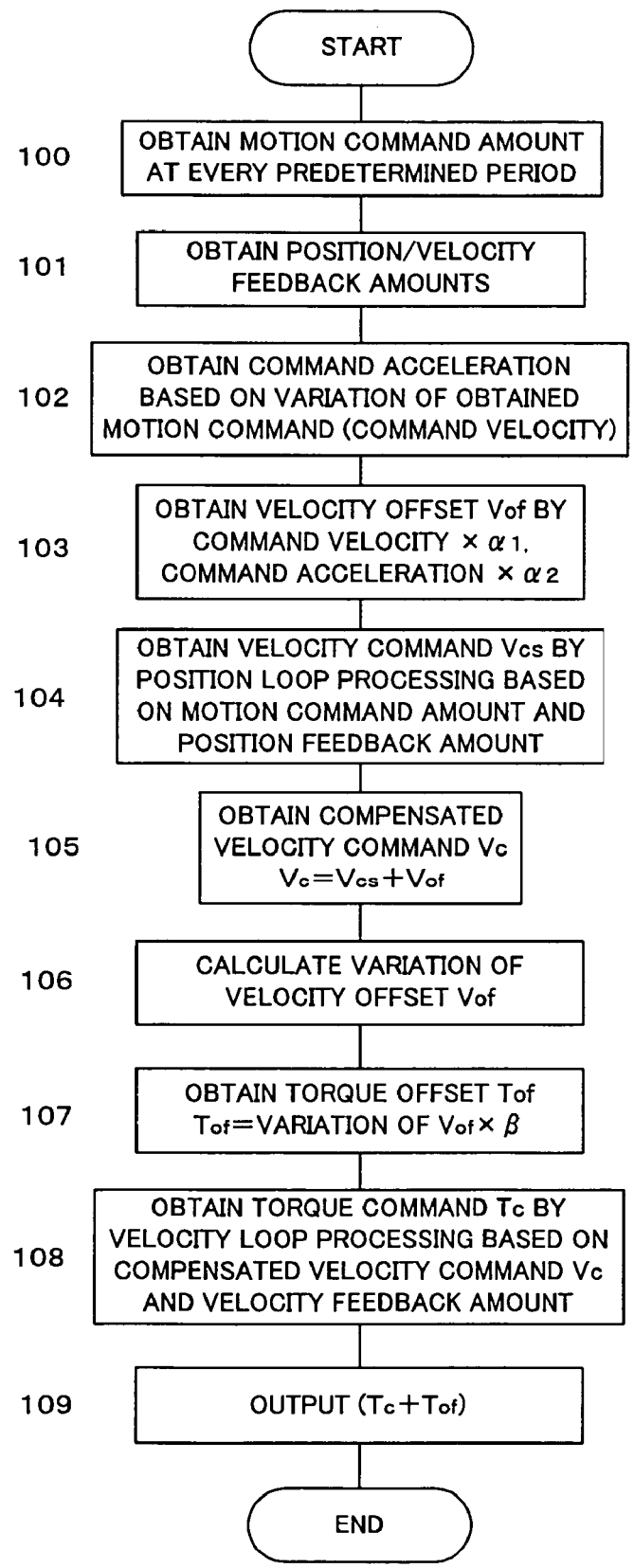
FIG. 7 is a flowchart showing processing to be performed at every predetermined period by a processor of a digital servo circuit used for performing control of the first embodiment.

FIG. 7 is a flowchart showing a process performed at every predetermined period by a processor of a digital servo circuit that is used for performing the control of the first embodiment shown in FIG. 1.

The numerical controller 51, based on an inputted program, outputs a motion command via the shared memory 52 to the digital servo circuit 53 in each distribution period. In response to this motion command, the digital servo circuit 53 starts the process shown in FIG. 7 at every predetermined period. First, a motion command for every predetermined period is obtained (Step 100). Since each motion command is obtained in the predetermined period, the motion command substantially equals to the command velocity. In addition, a feedback amount of the position and the velocity feedbacked from the position/velocity detector 55 are read (Step 101).

Thereafter, the acceleration of the command is obtained from difference between the obtained motion command (command velocity) of the present period and the motion command of the previous period (Step 102). The velocity offset amount Vof is obtained by adding a value found by multiplying the command velocity by the compensation coefficient $\alpha_1$ and a value found by multiplying the command acceleration by the compensation coefficient $\alpha_2$ (Step 103). A position deviation is obtained on the basis of the motion command obtained in Step 100 and the feedback amount of the position that is obtained in Step 101, and the velocity command Vcs is then found by multiplying the position deviation by the position gain Kp (Step 104).

Substantially, the compensated velocity command Vc is obtained by adding the velocity offset amount Vof and the velocity command Vcs obtained in Steps 103 and 104, respectively (Step 105). Furthermore, variation (differentiated value) of the velocity offset amount is obtained from difference between the velocity offset amount Vof of the previous period and that of the present period, and the torque offset amount Tof is found by multiplying the variation by the compensation coefficient β (Steps 106 and 107).

Moreover, based on the velocity command obtained in Step 105 and the velocity feedback amount obtained in Step 101, the velocity loop process is carried out to obtain the torque command Tc (Step 108). The torque offset amount Tof obtained in Step 107 is added to the obtained torque command Tc, and the result is outputted to an electric current control section as a torque command (electric current command) (Step 109). Although not illustrated, the electric current control section performs the electric current loop process and the like according to the torque command as in prior art, and also carries out the drive control over the servomotor 3 through the servo amplifier 54.

Figure 8:
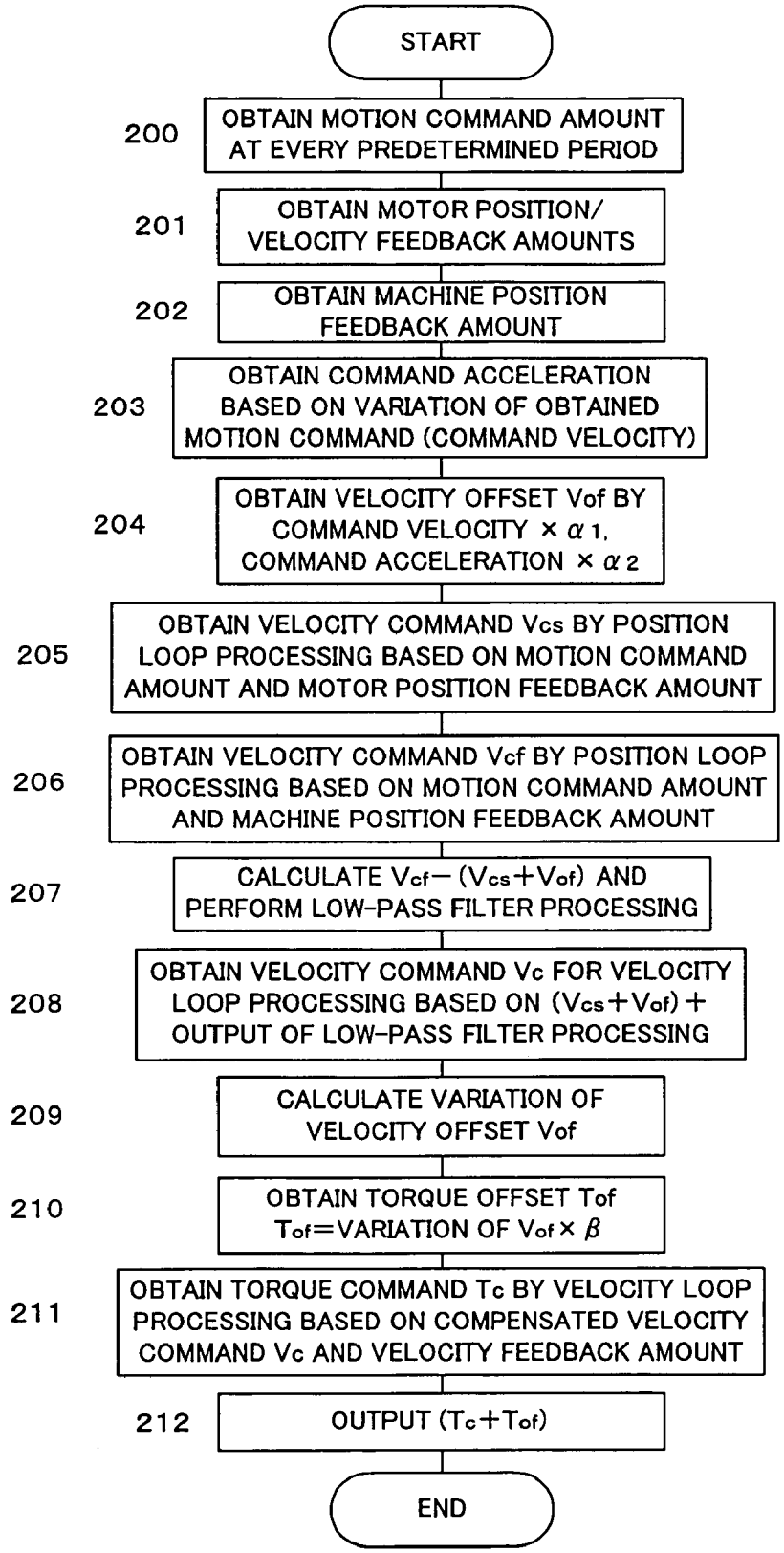
FIG. 8 is a flowchart showing processing to be performed at every predetermined period by a processor of a digital servo circuit used for performing control of the second embodiment.

FIG. 8 is a flowchart showing processing to be performed at every predetermined period by the processor of the digital servo circuit 53 in the second embodiment illustrated in FIG. 4.

The process of the second embodiment differs from that of the first embodiment only in that the second embodiment includes a process of reading the feedback amount of the machine position in Step 202, and a process of Steps 200 through 205 is identical to that of Steps 100 through 104 according to the first embodiment. In the second embodiment, a position deviation is obtained on the basis of a motion command amount of the predetermined period that is obtained in Step 200 and a machine position feedback amount that is read in Step 202. The position deviation is then multiplied by the position gain Kp, and based on the result, the full-closed position loop process is performed to obtain the velocity command Vcf (Step 206).

The velocity offset amount Vof obtained in Step 204 and the velocity command Vcs obtained by the semi-closed loop process of the position (position loop process based on the feedback amount of the motor position) in Step 205 are subtracted from the obtained velocity command Vcf, and the result is passed through the lowpass filter (Step 207). Subsequently, the result obtained by the lowpass filter process, the velocity offset amount Vof and the velocity command Vcs obtained by the semi-closed loop process are added together to obtain the velocity command Vc (Step 208).

The process of Steps 209 through 212 is identical to that of Steps 106 through 109 of the flowchart shown in FIG. 7 of the first embodiment, the process including Steps of obtaining the torque command Tc by carrying out the velocity loop process on the basis of the velocity command, obtaining the torque offset amount Tof from the velocity offset amount, adding the torque offset amount Tof to the torque command Tc, and outputting the result after the electric current loop process.

Figure 9:
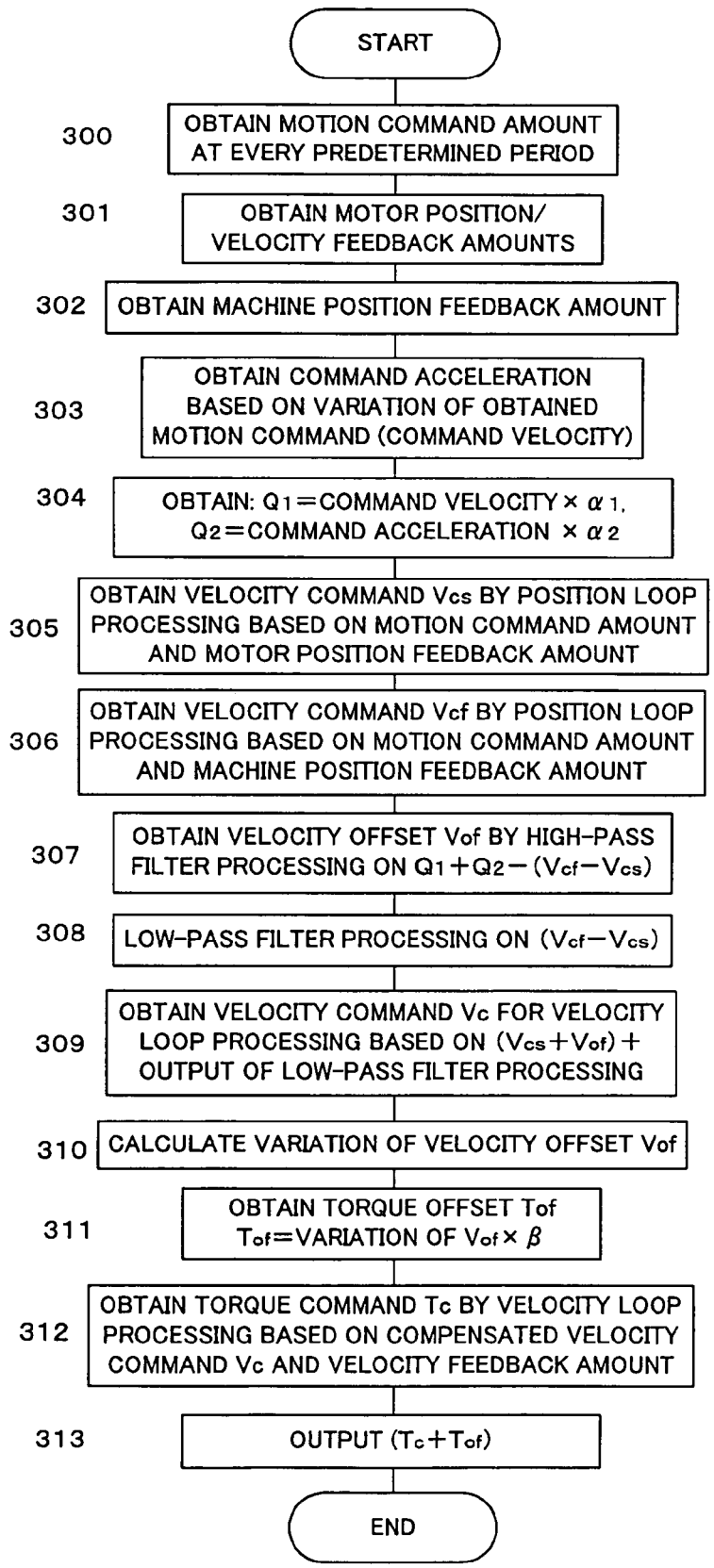
FIG. 9 is a flowchart showing processing to be performed at every predetermined period by a processor of a digital servo circuit used for performing control of the third embodiment.

FIG. 9 is a flowchart showing processing to be performed at every predetermined period by the processor of the digital servo circuit 53 in the third embodiment illustrated in FIG. 5.

A motion command (velocity command) for every predetermined period is obtained on the basis of the motion command outputted from the numerical controller 51. At the same time, the feedback amounts of the motor and machine positions are read, and the motion command (velocity command) is differentiated (obtained from difference between the motion command of the previous period and that of the present period), thus obtaining command acceleration (Steps 300 through 303). These Steps are identical to Steps 200 through 203 of the second embodiment. Thereafter, a compensation value $Q_1$ found by multiplying the velocity command (motion command amount in the predetermined period) by a compensation coefficient $\alpha_1$ and a compensation value $Q_2$ found by multiplying the command acceleration by a compensation coefficient $\alpha_2$ are calculated (Step 304).

Furthermore, a position deviation is obtained on the basis of the motion command amount and the feedback amount of the motor position, and the semi-closed loop process of the position for multiplying the position deviation by the position gain Kp is performed to obtain the velocity command Vcs (Step 305). In the same manner, a position deviation is obtained on the basis of the motion command amount and the feedback amount of the machine position, and the full-closed loop process of the position for multiplying the position deviation by the position gain Kp is performed to obtain the velocity command Vcf (Step 306).

A value $(Q_1+Q_2)$ corresponding to the estimated torsion amount is found by adding the compensation amounts $Q_1$ and $Q_2$ obtained in Step 304, and the velocity command Vcs by the semi-closed loop process, that is obtained in Step 305, is subtracted from the velocity command Vcf by the full-closed loop process, that is obtained in Step 306, thus obtaining a value (Vcf−Vcs) corresponding to the actual torsion amount. Then, the value (Vcf−Vcs) corresponding to the actual torsion amount is subtracted from the value $(Q_1+Q_2)$ corresponding to the estimated torsion amount to obtain a value $(Q_1+Q_2-(Vcf-Vcs))$ corresponding to a torsion amount deviation. The value corresponding to the torsion amount deviation is passed through the highpass filter to obtain the velocity offset amount Vof (Step 307).

Moreover, the value (Vcf−Vcs) corresponding to the actual torsion amount is subjected to the lowpass filter process (Step 308). Subsequently, the resultant value produced by the lowpass filter process is subjected to the semi-closed loop process, and is added to the velocity command Vcs and the velocity offset amount Vof, thus obtaining the velocity command Vc (Step 309).

A process subsequent to Step of obtaining the velocity command Vc is similar to the process of Steps 106 through 109 of the first embodiment and to the process of Steps 209 through 212 of the second embodiment. That is, the torque offset amount Tof is obtained from the velocity offset amount Vof, and the torque command Tc obtained by performing the velocity loop process based on the velocity command Vc is added to the torque offset amount Tof, thereby outputting the result to the electric current loop process (Steps 310 through 313).

In each of the above-described embodiments, the torque offset amount Tof is found by multiplying the variation of the velocity offset amount, namely the differentiated value of the velocity offset amount, by a given compensation coefficient $\beta$. This relation is illustrated in a graph of FIG. 10a. The torque offset amount, however, may be obtained through Steps of defining a relation between the differentiated value of the velocity offset amount and the torque offset amount shown by a segmented line in FIG. 10b, defining a linear expression with respect to a range of the velocity offset amount to store the linear expression, and obtaining the torque offset amount from the defined linear expression according to the velocity offset amount. Furthermore, the torque offset amount may be obtained through other Steps of storing a corresponding relation between the differentiated value of the velocity offset amount and the torque offset amount in the form of a table as shown in FIG. 10c, and obtaining the torque offset amount from the velocity offset amount on the basis of the table.

In each of the above-described embodiments, the velocity offset amount is obtained by adding the offset amount proportional to the command acceleration and the offset amount proportional to the command velocity. However, the offset amount corresponding to the friction proportional to the command velocity may be disregarded, and the velocity offset amount may be constructed only by the offset amount proportional to the command acceleration.

Moreover, it is possible to achieve the object to certain degree by simply performing compensation by the torque offset amount, without the compensation by the velocity offset amount. In other words, jerk of the command is obtained by third-order differentiating the position command, and the command jerk is multiplied by a coefficient to obtain the torque offset amount. The torque offset amount is added to a torque command outputted by the velocity loop control to correct the torque command, thus driving the servomotor at the compensated torque command.

Figure 11:
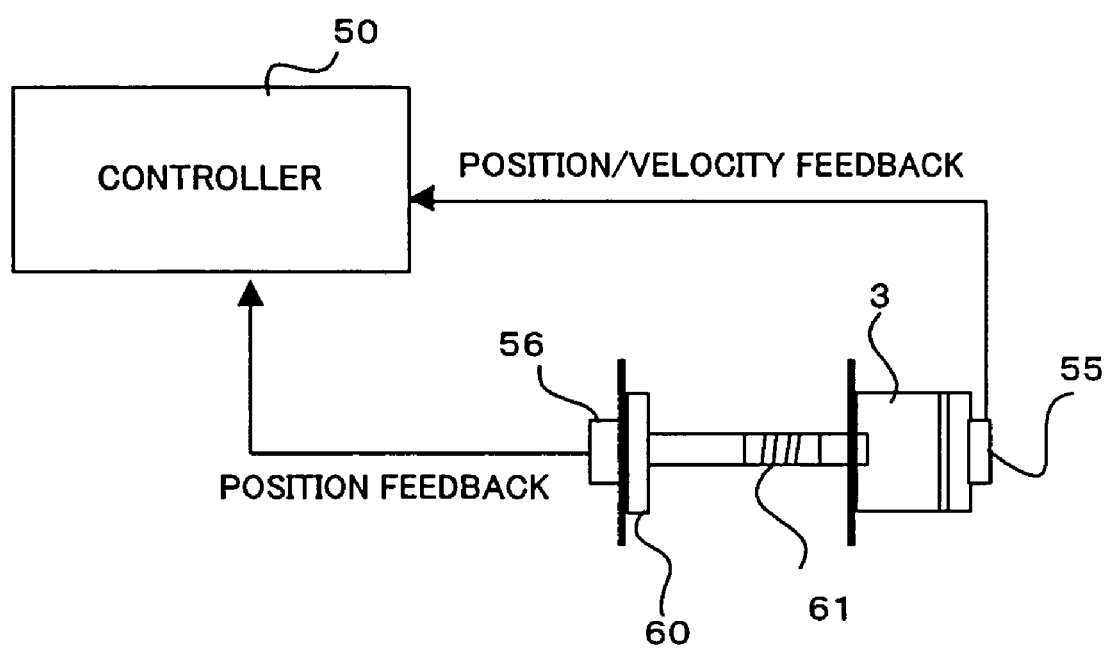
FIG. 11 is an explanatory diagram showing construction of an experimental apparatus operated to make a judgement on advantages of the present invention.

Accordingly, in order to judge advantages of the present invention, an experiment was performed with construction as shown in FIG. 11. Referring to FIG. 11, a member 60 having given inertia is mounted on the servomotor 3 with a torsion element 61 therebetween, and a position detector 56 for detecting a rotational position of the member 60 is mounted thereon. Moreover, the servomotor 3 is provided with a rotor shaft to which a position/velocity detector 55 for detecting a rotational position and velocity thereof is fixed, thereby forming the construction so that the outputs of the position detector 56 and the position/velocity detector 55 are feedbacked to a controller 50.

Figure 12A:
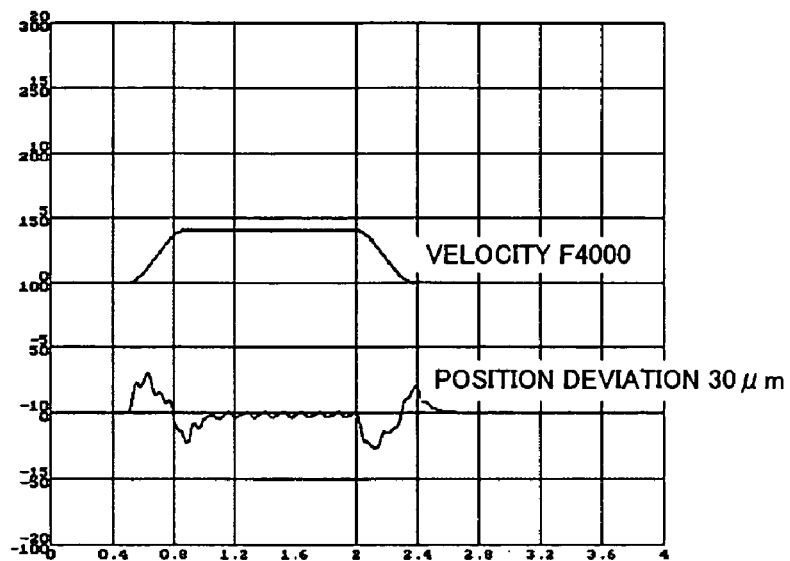
FIGS. 12a and 12b are graphs showing experimental results.

FIG. 12*a* is a graph showing a conventional result when a position deviation between the command position and the machine position at the time of acceleration/deceleration is measured with the above experimental apparatus by performing the position and the velocity loop control using the semi-closed loop in which neither the velocity offset compensation nor the torque offset compensation is carried out and giving a motion command at a velocity of 4000. At the time of both acceleration and deceleration, the position deviation was increased, thus creating a strong vibration. The maximum position deviation was 30 μm.

Figure 12B:
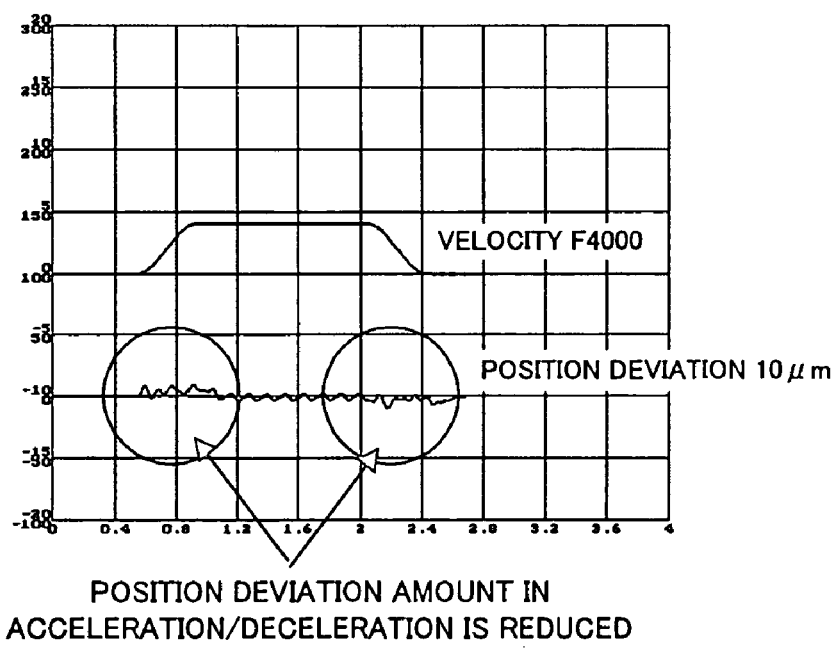

On the other hand, the control system was switched to the controlling method according to the second embodiment shown in FIG. 4. This experimental apparatus was driven to give a motion command at a velocity of 4000, and a position deviation between the command position and the machine position at the time of acceleration/deceleration is measured. The result is illustrated by a graph of FIG. 12*b*. As shown in the same graph, there occurs no vibration even at the time of acceleration/deceleration, and the maximum position deviation was 10 μm, thus achieving improvement.

When control is placed over the position of a movable part of a large-scaled machine or the like having low rigidity, in which a torsion element or the like is present in between a motor and the machine's movable part, the present invention is capable of preventing a response delay caused by the low rigidity and vibrations generated by the delay, thereby being capable of reducing the delay and the vibrations.

What is claimed is:

1. A controller for controlling a servomotor for driving a movable part of a machine such that a position of the movable part is controlled by performing a position loop control based on a position command and a detected motor position to obtain a velocity command and by performing a velocity loop control based on the velocity command and a detected motor velocity to obtain a torque command for the servomotor, said controller comprising:

velocity command determining means for obtaining a compensated velocity command for the velocity loop control by adding a velocity offset amount, proportional to a command acceleration and corresponding to a torsion amount, to the velocity command outputted by the position loop control;

torque offset calculation means for calculating a torque offset amount based on a differentiated value of the velocity offset amount; and torque command determining means for obtaining a compensated torque command for the servomotor by adding the torque offset amount to a torque command outputted by the velocity loop control performed based on the compensated velocity command.

2. A controller according to claim 1, further comprising first additional means for obtaining an additional velocity command for a position full-closed loop control based on the command position and a detected position of the movable part of the machine; and second additional means for adding a high frequency component of the compensated velocity command and a low frequency component of the additional velocity command, and outputting an obtained sum to the velocity loop control.

3. A controller according to claim 2, wherein said second additional means outputs a sum of: a low frequency component subjected to low-pass filter processing of an amount obtained by subtracting the compensated velocity command from the additional velocity command; the velocity command outputted by the position loop control; and the velocity offset amount.

4. A controller according to claim 1, wherein the velocity offset amount proportional to the command acceleration is obtained by second-order differentiation of the position command.

5. A controller according to claim 1, wherein said torque offset calculation means obtains the torque offset amount by multiplying the differentiated value of the velocity offset amount by a predetermined proportional coefficient.

6. A controller according to claim 1, wherein said torque offset calculation means obtains the torque offset amount according to linear expressions expressing the torque offset amount for divided ranges of the differentiated value of the velocity offset amount.

7. A controller according to claim 1, wherein said torque offset calculation means obtains the torque offset amount according a table storing relation between the differentiated value of the velocity offset amount and the torque offset amount.

8. A controller for controlling a servomotor for driving a movable part of a machine such that a position of the movable part is controlled by performing a position loop control based on a command position and a detected motor position to obtain a velocity command and by performing a velocity loop control based on the velocity command and a detected motor velocity to obtain a torque command for the servomotor, said controller comprising:

velocity offset calculation means for obtaining a velocity offset amount by adding a first offset amount proportional to a command velocity and a second offset amount proportional to a command acceleration;

velocity command determining means for obtaining a compensated velocity command for the velocity loop control by adding the velocity offset amount to the velocity command outputted by the position loop control;

torque offset calculation means for calculating a torque offset amount based on a differentiated value of the velocity offset amount; and torque command determining means for obtaining a compensated torque command for the servomotor by adding the torque offset amount to the torque command outputted by the velocity loop control performed based on the compensated velocity command.

9. A controller according to claim 8, further comprising first additional means for obtaining an additional velocity command for a position full-closed loop control based on the command position and a detected position of the movable part of the machine; and second additional means for adding a high frequency component of the compensated velocity command and a low frequency component of the additional velocity command, and outputting an obtained sum to the velocity loop control.

10. A controller according to claim 9, wherein said second additional means outputs a sum of: a low frequency component subjected to low-pass filter processing of an amount obtained by subtracting the compensated velocity command from the additional velocity command; the velocity command outputted by the position loop control; and the velocity offset amount.

11. A controller according to claim 8, wherein the second offset amount proportional to the command acceleration is obtained by second-order differentiation of the position command.

12. A controller according to claim 8, wherein said torque offset calculation means obtains the torque offset amount by multiplying the differentiated value of the velocity offset amount by a predetermined proportional coefficient.

13. A controller according to claim 8, wherein said torque offset calculation means obtains the torque offset amount according to linear expressions expressing the torque offset amount for divided ranges of the differentiated value of the velocity offset amount.

14. A controller according to claim 8, wherein said torque offset calculation means obtains the torque offset amount according a table storing relation between the differentiated value of the velocity offset amount and the torque offset amount.

15. A controller for controlling a servomotor for driving a movable part of a machine so as to control a position of the movable part, comprising:

first position control means for obtaining a first velocity command based on a position deviation between a command position and a detected rotational position of the servomotor;

second position control means for obtaining a second velocity command based on a position deviation between the command position and a detected position of the movable part of the machine;

calculation means for calculating a velocity command difference obtained by subtracting the first velocity command from the second velocity command;

velocity control means for performing a velocity loop control based on a velocity command and a detected rotational velocity of the servomotor to obtain a torque command for the servomotor;

velocity offset calculation means for obtaining a velocity offset amount as a high frequency component of a difference obtained by subtracting the velocity command difference from an offset amount proportional to a command acceleration;

torque offset calculation means for calculating a torque offset amount based on a differentiated value of the velocity offset amount;

velocity command determining means for obtaining the velocity command to said velocity control means by summing a low frequency component of the velocity command difference, the first velocity command and the velocity offset amount; and torque command determining means for to obtaining a compensated torque command for the servomotor by adding the torque offset amount to a torque command outputted from said velocity control means.

16. A controller according to claim 15, wherein said velocity offset calculation means obtains the velocity offset amount as a high frequency component of a difference obtained by subtracting the velocity command difference from a sum of the offset amount proportional to the command acceleration and an offset amount proportional to a command velocity.

17. A controller according to claim 15, wherein the offset amount proportional to the command acceleration is obtained by second-order differentiation of the position command.

18. A controller according to claim 15, wherein said torque offset calculation means obtains the torque offset amount by multiplying the differentiated value of the velocity offset amount by a predetermined proportional coefficient.

19. A controller according to claim 15, wherein said torque offset calculation means obtains the torque offset amount according to linear expressions expressing the torque offset amount for divided ranges of the differentiated value of the velocity offset amount.

20. A controller according to claim 15, wherein said torque offset calculation means obtains the torque offset amount according a table storing relation between the differentiated value of the velocity offset amount and the torque offset amount.

* * * * *

UNITED STATES PATENT AND TRADEMARK OFFICE
CERTIFICATE OF CORRECTION

PATENT NO. : 7,030,585 B2 Page 1 of 1
APPLICATION NO. : 10/751914
DATED : April 18, 2006
INVENTOR(S) : Yasusuke Iwashita et al.

It is certified that error appears in the above-identified patent and that said Letters Patent is hereby corrected as shown below:

Column 5, line 42, change "rigidity," to --rigidity--

Column 7, line 54, change "VcfL)" to --VcfL--

Signed and Sealed this

Fifteenth Day of August, 2006

JON W. DUDAS
*Director of the United States Patent and Trademark Office*